Patented Jan. 4, 1949

2,457,820

UNITED STATES PATENT OFFICE 2,457,820

AMINO ACID SOLUTION AND PROCESS FOR PREPARING THE SAME

Eugene E. Howe, Linden, and Max Tishler, Rahway, N. J., assignors to Merck & Co., Inc., Rahway, N. J., a corporation of New Jersey No Drawing. Application December 27, 1945, Serial No. 637,498

3 Claims. (Cl. 167—65)

This invention relates to amino acids and particularly to amino acid mixtures of the type intended for parenteral, rectal, and oral use in therapy requiring the administration of large amounts of amino acids, and to the preparation of such mixtures. Amino acid mixtures of this sort are finding wide-spread use in medicine to restore and maintain the proper nitrogen balance and the necessary nutritional state of the body in the treatment of conditions where a large protein loss exists as, for example, after injury, post-operative shock, severe malnutrition, damage to the alimentary canal, and the like.

Amino acid mixtures previously available in the form of acid, basic, or enzymatic hydrolysates are not entirely satisfactory because they cause certain undesirable side reactions when administered in large doses and at a fast rate. There is, for example, a marked tendency to produce nausea and vomiting when such hydrolysates are administered at rates or in amounts exceeding very low limits. In most cases where administration of amino acids is necessary or desirable, side reactions of this type can not be tolerated because of the weakened condition of the patient; and administration of the hydrolysates at rates which will not cause these reactions greatly reduces the effectiveness of the treatment as a means for restoring and maintaining proper protein balance.

Recently, Madden et al., J. Exptl. Med. 79, 607–624 (1944), has shown that mixtures of eleven pure amino acids containing 60% of natural essential amino acids are definitely superior to protein hydrolysates in being tolerated, maintaining nitrogen balance, and in regenerating blood protein. The mixtures of pure amino acids thus have the advantage that they can be infused into patients more rapidly and in larger amounts. There are also marked disadvantages in such mixtures. Foremost of these is the high cost of pure amino acids and the unavailability of large quantities required for widespread therapy. Secondly, these mixtures contain approximately 25% of d-amino acids (the unnatural form) a large part of which probably can not be utilized by the human body (see Rose, Physiological Reviews, 18, 109 (1938); Albanese, Bulletin of Johns Hopkins Hospital, 75, 175 (1944)) and which undoubtedly limits the usefulness of the mixture.

It is now discovered in accordance with the present invention that by a new procedure, fully hereinafter described, it is possible to prepare from inexpensive protein material an amino acid mixture consisting predominantly of the natural essential amino acids which is superior nutritionally and toxicologically to any protein hydrolysate or mixture of amino acids prepared previously and which can be administered in oral, rectal, and parenteral therapy at rates and in amounts heretofore impossible with existing amino acid preparations.

The striking increase in the rate at which our amino acid mixture may be administered parenterally is clearly demonstrated by the following tabulation based upon an extended comparison of the rates at which various preparations are tolerated when a total of 220 mgms. of N/kgm. of body weight is infused into the normal dog.

TABLE I

| Preparation | Lowest rate in mgm. N/kgm./min. which will produce vomiting |
| --- | --- |
| Our mixture | 30 |
| Madden—mixture of pure amino acids | 6 |
| Enzymatic hydrolysate | 4 |
| Acid hydrolysate | 2 |

A further advantage of our mixture over the Madden mixture is that there is less spillage into the urine. When both solutions are infused at 6 mgms. of N/kgm./min. and a total of 200 mgms. of N/kgm. is given, 19% of the amino acids of the Madden solution is lost into the urine in 24 hours whereas only 13% of those of our mixture is lost in an equal period of time.

Speed of infusion would be of no great advantage if there were a corresponding increase of spillage of amino acids into the urine. Experiments have shown this not to be the case with our solution; the loss into the urine is the same at rates of 6 and 12 mgms. of N/kgm./min.

Regarded in certain of their broader aspects, novel features of the present invention include, as new products, balanced mixtures of the natural essential amino acids in substantially pure form, characterized as being free of dicarboxylic acids and substantially free of physiologically inactive isomeric amino acids, and the process of preparing such mixtures that comprises isolating from a protein acid hydrolysate a fraction consisting of substantially pure natural essential monoamino monocarboxylic acids, and adding to said fraction substantially pure tryptophane, essential basic amino acids, and fortifying amounts of essential monoamino monocarboxylic acids present but deficient in said fraction.

In carrying out the process in accordance with the present invention, any protein which is high in essential amino acid content can be used as the starting material. Casein, lactalbumin, fibrin, blood plasma proteins, and yeast proteins are but a few of the more common proteins that can be used and it will be understood that mixtures of two or more protein materials can be employed equally as well as individual proteins.

Preparation of an acid hydrolysate of the selected protein or protein mixture is effected by conventional hydrolysis procedure as, for example, by heating with sulfuric acid, hydrohalic acids, phosphoric acid, sulfonic acids, and the like. By way of illustration, the desired hydrolysis is effected by heating for about 20 hours in 20% by volume (approximately 7.5 N) sulfuric acid. It will be understood, however, that heating for a longer period with a less concentrated acid or for a shorter period with more concentrated acid is equally as effective in forming the protein hydrolysate.

After completion of the hydrolysis, excess acid is removed by forming an insoluble salt of the acid and filtering off the precipitate. Thus, for example, sulfuric acid can be removed by addition of barium hydrate sufficient to obtain a pH of about 5.4 Hydrohalic acids can be removed by addition of silver oxide or ion exchange bases and, if alkyl sulfonic acids are used in the hydrolysis, excesses can be removed as in the case of sulfuric acid by addition of barium hydrate. Excess phosphoric acid can be likewise removed by forming the insoluble calcium or barium salt. Thus, it is apparent that protein acid hydrolysates generally, when free of excess acid, are suitable for treatment according to successive steps embodied in the present invention. It will be noted, in this connection, that it is not necessary to remove all of the acid from the hydrolysate. Retention of amounts of acid sufficient to form hydrohalide, sulfate, or other quaternary salts of a portion of the amino acids is not objectionable and, in fact, is in some instances to be desired as such salts are well tolerated and utilized in the body.

By way of illustration, the following example is given as a typical procedure for converting a protein or protein mixture to a mixture of substantially pure natural essential amino acids having the new and advantageous properties herein disclosed.

EXAMPLE

Step 1.—About 450 gms. of technical casein is heated under reflux for approximately 20 hours with about 1800 gms. of about 7.5 N sulfuric acid (20% by volume). The resulting hydrolysate is treated with sufficient barium hydrate to obtain a pH of about 5.4 and causing precipitation of barium sulfate which is removed and washed by conventional chemical operations.

Step 2.—The resulting filtrate and washings are concentrated under reduced pressure to approximately 2200 cc., and the remaining sulfate precipitated with additional barium hydrate. The solution is then cooled to about 5–10° C. for about 16 hours causing precipitation of tyrosine. To this suspension is added about 45 gms. of activated charcoal and the mixture filtered. The precipitate is washed with about 150 cc. of water which is then added to the filtrate.

Step 3.—The resulting solution is extracted batch-wise with about 20 two liter portion of butanol. Alternatively, the solution can be continuously extracted in a liquid liquid-extractor with butanol for about 36 hours. The butanol is then concentrated under reduced pressure until the solution is free of water. The monoamino monocarboxylic acids are thus precipitated and are removed and dried by conventional operations. This fraction is known as the M. A. fraction and consists largely of the following six essential amino acids: leucine, isoleucine, phenylalanine, valine, methionine, and threonine.

Step 4.—The spent liquor remaining after the butanol extraction is concentrated to remove dissolved butanol and then rediluted to about 2300 cc.

About 4 liters of the solution thus prepared is passed through a column containing about 2000 gms. of Amberlite IR-100 (34% moisture) (a completely cured phenol formaldehyde synthetic resin, C stage). The column is then washed with about 4 liters of water, and finally eluted with approximately 4 liters of sulfuric acid (4.5%). This column is again washed with about 4 liters of water, the first two liters of which are combined with the acid eluate.

Four such eluates and washings are combined and the sulfuric acid is removed by balancing with barium hydrate. The precipitated barium sulfate is removed and washed with water, and the filtrate and washings combined and concentrated under diminished pressure to approximately 6 liters. During this heating, ammonia is evolved. The resulting solution obtained is known as the basic fraction and contains the three basic essential amino acids, arginine, histidine, and lysine, which have been preferentially absorbed in the Amberlite column.

Step 5.—The M. A. fraction obtained in step 3 and the basic fraction obtained in step 4 are then assayed to determine the amounts of individual essential amino acids contained therein. The M. A. fraction was found to contain approximately 14.3% isoleucine, 32% leucine, 10.3% methionine, 16% phenylalanine, 3.12% threonine and 11.1% valine; and the basic fraction was found to contain about 33% arginine, 15% histidine, and 49% lysine. On the basis of this data, the two fractions are combined in the proper proportions and amounts of tryptophane and other crystalline amino acids in which the two fractions are deficient are then added to give the concentration of individual amino acids that is desired in the final mixture.

Sufficient water is added to the mixture to place all components in solution and nitrogen is passed through the solution for several minutes so that all but traces of oxygen are removed (to prevent decomposition of tryptophane in subsequent processing). The solution is then treated with about 10% (based upon weight of solids in the solution) of activated charcoal, filtered, and then autoclaved at about 120° C. under nitrogen for about three hours. The solution is then allowed to stand in the cold for about 16 hours and is again filtered through about 2% of activated charcoal. The solution is now complete but for final sub-division and subsequent sterilization which is effected by autoclaving for about 30 minutes under nitrogen or, alternatively, by filtration through a suitable adsorbent material such as Ertel discs (filter pads of an asbestos composition).

Before sub-dividing the solution, its nitrogen content is determined by the Kjeldahl method and it is tested biologically for pyrogens in the rabbit, toxicity in the mouse, tolerance in the dog, and antigenicity in the guinea pig.

A typical solution has the following approximate composition after combination of the fractions and fortification:

TABLE II

| | Grams |
|---|---|
| Basic fraction (in solution) | 20.0 |
| M. A. fraction | 54.7 |
| dl-Threonine | 7.4 |
| dl-Tryptophane | 1.8 |
| dl-Methionine | 1.1 |
| Glycine | 10.0 |
| Chloride (HCl) | 3.0 |
| Total | 98.0 |

This solution is diluted to 1250 cc. and corresponds to an 8% solution of the Madden mixture.

Below is a tabulation of the essential amino acids content of a typical solution on a dry basis:

TABLE III

| Essential Amino Acids | Per cent of Solids |
|---|---|
| Arginine | 6.6 |
| Histidine | 3.0 |
| Isoleucine | 7.8 |
| Leucine | 17.5 |
| Lysine | 9.8 |
| Methionine | 6.2 |
| Phenylalanine | 8.7 |
| Threonine | 5.4 |
| Tryptophane | 0.9 |
| Valine | 6.1 |
| Total | 72.0 |

In addition to advantages previously mentioned, it will be noted from the following tabulation that our mixture contains a substantially higher percentage (based upon total solids) of essential amino acids than do other available preparations.

TABLE IV

*Per cent of essential amino acids in solids*

| Natural Essential Amino Acids | Our Mixture | Madden Mixture | Commercial Fortified Hydrolysates | | Lactalbumin |
|---|---|---|---|---|---|
| | | | Enzymatic | Acid | |
| Arginine | 6.6 | 6.6 | 3.4 | 3.8 | 3.8 |
| Histidine | 3.0 | 3.0 | 2.0 | 1.6 | 2.1 |
| Isoleucine | 7.8 | 5.4 | 6.0 | 6.1 | 6.4 |
| Leucine | 17.5 | 15.4 | 7.7 | 10.6 | 10.5 |
| Lysine | 9.8 | 9.8 | 7.8 | 8.2 | 9.6 |
| Methionine | 6.2 | 3.1 | 2.0 | 3.5 | 3.1 |
| Phenylalanine | 8.7 | 3.5 | 4.4 | 3.6 | 5.4 |
| Threonine | 5.4 | 5.4 | 5.1 | 2.9 | 7.4 |
| Tryptophane | 0.9 | 0.9 | 1.1 | 1.0 | 2.6 |
| Valine | 6.1 | 6.9 | 5.6 | 7.3 | 6.4 |
| Total | 72.0 | 60.0 | 45.0 | 48.7 | 57.3 |
| Essential amino acids in inactive form | 5.0 | 25.0 | | | |

Lactalbumin was chosen as a protein for comparison because it is considered to be extremely well-balanced with respect to essential amino acids.

Our preparation, as well as Madden's mixture of synthetic amino acids, is essentially free of dicarboxylic amino acids whereas the hydrolysate preparations and lactalbumin contain about 25% of dicarboxylic acids. This accounts in part for the low toxicity of the present mixture, particularly when administered parenterally, as shown in Table I. The marked difference in toxicity between our mixture and that of Madden is probably due to the fact that Madden's mixture, being made up largely of synthetic amino acids, contains larger amounts of inactive d-isomers, together with the l-, or natural essential amino acids.

As previously pointed out, acid hydrolysates generally, after removal of the excess acid and precipitation of tyrosine, can be subjected to subsequent steps for separation and purification of the monoamino monocarboxylic acid and basic amino acid fractions. The extraction of the essential monoamino monocarboxylic acids can be effected with any 3 to 5 carbon alcohol.

Although some of these alcohols do not form separate layers when mixed with water alone, a separation is effected in the presence of concentrated amino acid solutions. Water can be removed from the extract at either atmospheric pressure or reduced pressure.

There are a number of adsorbents which can be used for the isolation of the basic essential amino acid fraction. These include, in addition to the Amberlite ion exchange resins (completely cured phenol formaldehyde synthetic resins, C stage) Zeo Karb H (a natural resin made by sulfonating coal), Filtrol-neutral (a type of fuller's earth) and the like. Elution of the adsorbate can also be effected by mineral acids other than sulfuric acid such as 5–35% hydrochloric acid or 8–12% phosphoric acid which are then removed by suitable means. The adsorbate may also be eluted with about 18% aqueous ammonia, and the ammonia is then removed by distillation. The basic fraction can also be obtained by electrical transport methods or by precipitation with phosphotungstic acid.

In recombining the two fractions and fortifying the resulting mixture, it will be apparent that the composition of the final product can be varied at will to meet demands for large amounts of a uniform product as well as for products having particular compositions to treat specific cases.

It will further be noted that the improved mixtures of the present invention can also be prepared by combining the substantially pure monoamino monocarboxylic acid fraction prepared as above described with tryptophane and fortifying amounts of amino acids present but deficient in said fraction, and then supplying the three basic amino acids individually derived in pure form from the particular starting protein hydrolysate, or from other sources. Thus, referring back to Table II, the solid components of an amino acid mixture, according to the present invention, should contain about 52–57% of the M. A. fraction (monoamino monocarboxylic acid fraction) and about 19–21% of the three basic amino acids supplied either as the basic fraction prepared by the process disclosed herein or by combining arginine, histidine, and lysine isolated in essentially pure form from the basic fraction or from other sources in approximately the ratio of these amino acids as given in Table III (6.6 parts of arginine, 3.0 parts of histidine, and 9.8 parts of lysine). It will be understood that by either procedure the basic amino acids are added as the natural or l-acids and therefore the overall composition of the amino acid mixture is not affected by the source of the basic amino acids. The fortifying amounts of crystalline essential amino acids, including tryptophane and essential amino acids present but deficient in the M. A. fraction, comprise less than 11% of the total solids in the mixture and about 10% of glycine is included in the mixture.

Tryptophane, which must always be added as it is destroyed in the acid hydrolysis, can be added either as the active isomer or as a racemic compound. The small amount of the inactive isomer introduced in the racemic compound does not appreciably decrease the tolerance of the mixture. When a number of amino acids in racemic form are used for fortification, the tendency to decrease the tolerance of the mixture becomes more pronounced. There is distinct advantage, therefore, in selecting as starting material a protein or protein mixture which will supply as nearly as possible the ratio and amounts of the essential amino acids required in the final product.

As used throughout the specification and claims it is to be understood that the expression "natural essential amino acids" embraces only the active or l-form of the seven monoamino monocarboxylic acids: leucine, isoleucine, phenylalanine, valine, methionine, threonine and tryptophane; and the three basic amino acids: arginine, histidine and lysine.

Modifications may be made in carrying out the present invention without departing from the spirit and scope thereof, and the invention is to be limited only by the appended claims.

What is claimed is:

1. An aqueous amino acid solution for parenteral, rectal, and oral administration containing not more than 5% of the essential amino acids in the inactive d-form, solid components of said solution being free of dicarboxylic acids and comprising the natural essential amino acids leucine, isoleucine, phenylalanine, valine, methionine, threonine, arginine, histidine, and lysine, racemic essential amino acids including tryptophane, and the non-essential amino acid glycine.

2. In a process for preparing an amino acid solution for parenteral, rectal, and oral administration, the steps that comprise extracting an aqueous protein acid hydrolysate with a 3 to 5 carbon alcohol, recovering from the alcohol extract an amino acid fraction free of dicarboxylic acids and consisting of the natural essential amino acids leucine, isoleucine, phenylalanine, valine, methionine and threonine and a small amount of non-essential amino acids, removing alcohol from the liquor remaining after alcohol extraction, treating the alcohol-free liquor with an adsorbent material which preferentially adsorbs basic amino acids, washing the adsorbent free of dicarboxylic acids and other contaminants, eluting the adsorbate with mineral acid, recovering from the eluate an amino acid fraction consisting of the natural essential basic amino acids arginine, histidine and lysine, and then mixing in an aqueous medium quantities of each of said fractions, racemic essential amino acids including tryptophane and the non-essential amino acid glycine to provide a solution the solid components of which are free of dicarboxylic acids and consist of the ten natural essential amino acids, not more than 5% of the essential amino acids in the inactive d-form, and non-essential amino acids.

3. In a process for preparing an amino acid solution for parenteral, rectal, and oral administration, the steps that comprise extracting an aqueous protein acid hydrolysate with butanol, recovering from the butanol extract an amino acid fraction free of dicarboxylic acids and consisting of the natural essential amino acids leucine, isoleucine, phenylalanine, valine, methionine and threonine and a small amount of non-essential amino acids, removing butanol from the liquor remaining after butanol extraction, treating the alcohol-free liquor with an adsorbent material which preferentially adsorbs basic amino acids, washing the adsorbent free of dicarboxylic acids and other contaminants, eluting the adsorbate with mineral acid, recovering from the eluate an amino acid fraction consisting of the natural essential basic amino acids arginine, histidine and lysine, and then mixing in an aqueous medium quantities of each of said fractions, racemic essential amino acids including tryptophane and the non-essential amino acid glycine to provide a solution the solid components of which are free of dicarboxylic acids and consist of the ten natural essential amino acids, not more than 5% of the essential amino acids in the inactive d-form, and non-essential amino acids.

EUGENE E. HOWE.
MAX TISHLER.

REFERENCES CITED

The following references are of record in the file of this patent:

UNITED STATES PATENTS

| Number | Name | Date |
|---|---|---|
| 2,386,926 | Block | Oct. 16, 1945 |

OTHER REFERENCES

Madden, Journal of Experimental Medicine, vol. 79, pages 607 to 624 (1944).

Melnick, Journal of the American Dietetic Association, October 1943, page 689 (167–65A).

Schmidt, Chemistry of the Amino Acids and Proteins (1938), pages 142 to 146.